United States Patent
Hess et al.

(10) Patent No.: US 8,692,501 B2
(45) Date of Patent: Apr. 8, 2014

(54) PERMANENT MAGNET ALTERNATOR MARGIN DETECTOR

(75) Inventors: Gary L. Hess, Enfield, CT (US); James A. Gosse, Storrs, CT (US); Steven A. Avritch, Bristol, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 293 days.

(21) Appl. No.: 13/161,815

(22) Filed: Jun. 16, 2011

(65) Prior Publication Data

US 2012/0320475 A1 Dec. 20, 2012

(51) Int. Cl.
*G05B 11/28* (2006.01)
*H02P 7/00* (2006.01)

(52) U.S. Cl.
USPC ........... 318/599; 318/140; 323/220; 323/224; 363/52; 363/127

(58) Field of Classification Search
USPC ............ 323/220, 224, 282, 28; 318/140, 599; 363/52, 127; 361/20, 56; 290/40 A
See application file for complete search history.

(56) References Cited

U.S. PATENT DOCUMENTS

| | | | |
|---|---|---|---|
| 6,697,245 B2 | 2/2004 | Andrews | |
| 6,769,874 B2 | 8/2004 | Arel | |
| 6,775,112 B1 | 8/2004 | Smith et al. | |
| 6,912,142 B2 | 6/2005 | Keim et al. | |
| 7,119,467 B2 | 10/2006 | Dooley | |
| 7,221,195 B2 | 5/2007 | Bhalla et al. | |
| 7,378,884 B2 | 5/2008 | Bhalla et al. | |
| 7,411,471 B2 | 8/2008 | Tsukahara | |
| 7,586,204 B2 * | 9/2009 | Hess et al. | 290/40 A |
| 7,602,153 B2 * | 10/2009 | Steiner | 322/59 |
| 7,848,123 B2 * | 12/2010 | Hess | 363/52 |
| 8,193,785 B2 * | 6/2012 | Peto | 323/224 |
| 2007/0069521 A1 | 3/2007 | Jabaji et al. | |
| 2008/0116858 A1 * | 5/2008 | Steiner | 322/25 |
| 2009/0167268 A1 * | 7/2009 | Peto | 323/282 |
| 2009/0184522 A1 * | 7/2009 | Hess et al. | 290/40 A |
| 2009/0189589 A1 * | 7/2009 | Peto | 323/300 |
| 2009/0224738 A1 * | 9/2009 | Peto | 323/282 |
| 2010/0172165 A1 * | 7/2010 | Hess | 363/127 |
| 2012/0212192 A1 * | 8/2012 | Peto | 323/223 |

OTHER PUBLICATIONS

UK Search Report dated Oct. 16, 2012 for UK Patent Application No. 1210474.1.

* cited by examiner

*Primary Examiner* — Paul Ip

(74) *Attorney, Agent, or Firm* — Carlson, Gaskey & Olds P.C.

(57) ABSTRACT

A shunt regulated permanent magnet alternator voltage source includes a permanent magnet alternator, a shunt regulator, and a pulse width modulation controller. Also included is a load controller capable of detecting a PMA margin.

15 Claims, 2 Drawing Sheets

PERMANENT MAGNET ALTERNATOR MARGIN DETECTOR

BACKGROUND

The present disclosure is directed to a permanent magnet alternator, and more particularly directed to a shunt regulated permanent magnet alternator including margin detection.

Permanent Magnet Alternators (PMAs) are currently used as alternating current (AC) power sources for many electrical applications. A rotating shaft within the PMA causes the PMA to generate electrical power according to known power generation techniques. The rotating shaft can be tied to any source of mechanical rotation to provide the necessary rotational forces. The PMA is configured such that power from the PMA is regulated to provide a load with a direct current (DC) voltage source. In such a configuration, a shunt regulator is typically connected to the PMA, thereby allowing for excessive current, not used by the attached loads, to be shunted back to the PMA or to ground.

In order to control the shunt regulator, a pulse width modulation (PWM) controller provides a PWM control signal that cycles the shunt regulator on and off. When the shunt regulator is on, the current bypasses the load and is directly shunted to ground. Thus, the shunt regulator can be rapidly cycled on and off with the percentage of off time in each cycle determining the percentage of the available current seen by the load. Introduction of a new load onto the shunt regulated PMA necessarily causes an increase in the amount of current required by the loads. When the current required by all of the loads exceeds the available current of the shunt regulated PMA voltage source, the voltage across the shunt regulator decreases. When the voltage across the shunt regulator decreases beyond a certain threshold, the control system can reset, resulting in undesirable control behaviors.

SUMMARY

A voltage source includes a permanent magnet alternator (PMA), a shunt regulator connected to receive current from the PMA. A pulse width modulation (PWM) controller has a PWM output, which is connected to the shunt regulator. The PWM controller is operable to at least partially control the switch timing of the shunt regulator. A load controller determines a PMA margin which has an input corresponding to the PWM control signal output. The PMA margin represents an amount of unused available current to supply from the voltage source to a load.

A method for protecting a pulse width modulated shunt regulated permanent magnet alternator includes the step of determining a permanent magnet alternator margin of the pulse width modulated shunt regulated permanent magnet alternator from a pulse width modulation (PWM) control signal, using a microprocessor.

A permanent magnet alternator margin control system which connects loads to a voltage source includes a sensor operable to detect a pulse width modulation (PWM) control signal of a shunt regulator. A PWM control signal conditioner is operable to condition the sensed control signal. A load controller including a microprocessor is operable to analyze the conditioned sensed control signal.

These and other features of the present invention can be best understood from the following specification and drawings, the following of which is a brief description.

DETAILED DESCRIPTION

Figure 1:
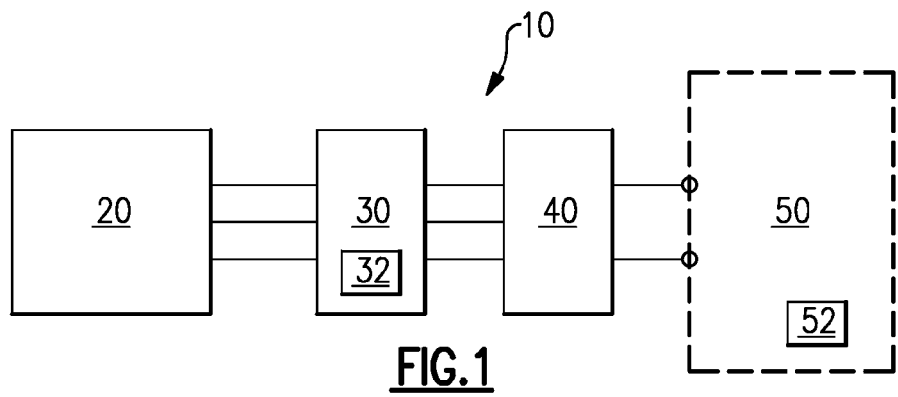
FIG. 1 illustrates a shunt regulated permanent magnet alternator (PMA) voltage supply.

FIG. 1 illustrates a shunt regulated permanent magnet alternator (PMA) based voltage source 10. The voltage source 10 includes a PMA 20 capable of generating three phase power from a rotating shaft according to known techniques. The generated power is sent to a shunt regulator 30. The shunt regulator 30 is controlled via a pulse width modulation (PWM) controller 32. The pulse width modulated, shunt regulated three phase power is then sent to a standard diode rectifier 40 which converts the three phase power into a DC current. The DC current is provided to a load 50. The load 50 includes multiple smaller loads, and the connection between the shunt regulated PMA voltage source 10 and each of the smaller loads is controlled via a load controller 52. The load controller 52 can include a microprocessor, where the microprocessor generically refers to any number of processors or processing circuitry, including programmable logic devices and the like. The load controller 52 can be part of the voltage source 10 or separate from the voltage source 10.

Figure 2:
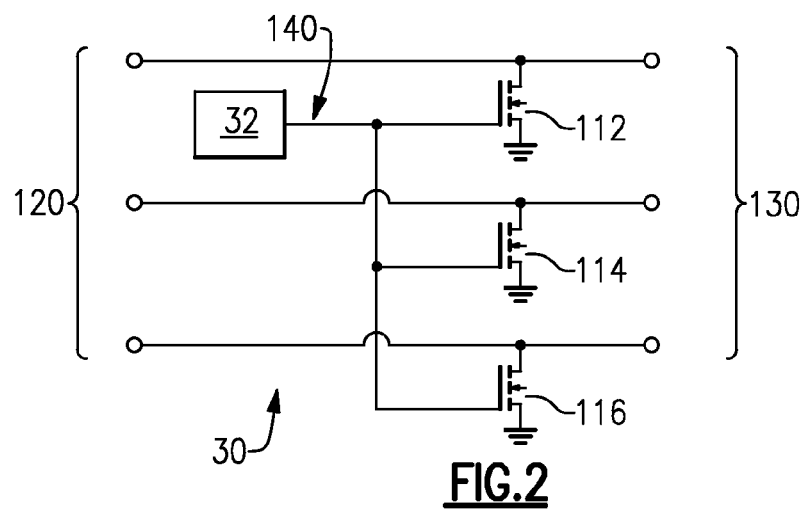
FIG. 2 illustrates a shunt regulator.

An example shunt regulator 30, which could be used in the example of FIG. 1, is illustrated in FIG. 2, with like numerals indicating like elements. The shunt regulator 30 includes transistors 112, 114, 116 connecting each phase of a three phase input 120 to ground. Each transistor 112, 114, 116 is also connected to a three phase output 130. The illustrated configuration allows current to flow freely through the shunt regulator 30 when the transistors 112, 114, 116 are off, but shunts the current directly to ground, through the transistors 112, 114, 116, when the transistors 112, 114, 116 are turned on. The switch timing or on/off status of the transistors 112, 114, 116 is controlled by the PWM controller 32, which provides a PWM control signal 140 to the control input of each transistor 112, 114, 116.

The PWM control signal 140 is either high, thus turning on the corresponding transistors 112, 114, 116 and shunting the current to ground, or low thus turning off the corresponding transistors 112, 114, 116 and allowing power to flow freely. The PWM controller 32 operates in cycles with the PWM control signal 140 being high for a portion of each cycle and low for a remainder of each cycle. Each PWM cycle has a short period, resulting in a perceived steady power flow over the output 130, but still shunting a portion of the current to ground. The length of each PWM control signal 140 cycle, and what portions of the PWM control signal 140 are high and low are design decisions and are determinable by a person of skill in the art.

Figure 3:
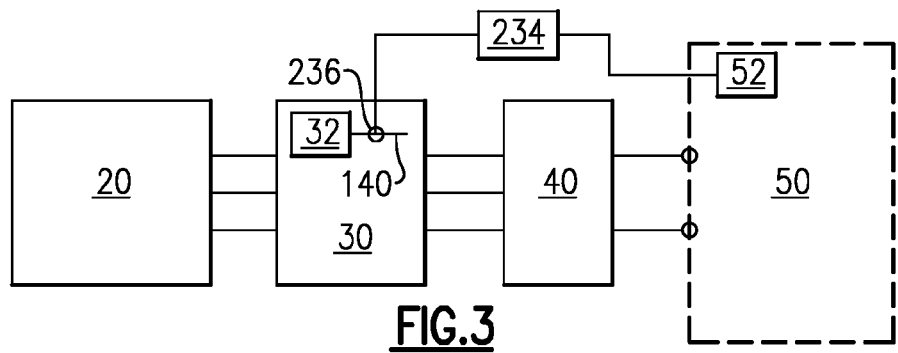
FIG. 3 illustrates a shunt regulated PMA voltage supply including a PMA margin control.

FIG. 3 illustrates the shunt regulated PMA voltage source 10 of FIG. 1 with additional PWM control signal 140 detection, with like numerals indicating like elements. The shunt regulator 30 includes an additional sensor 236 capable of detecting the PWM control signal 140. The sensor 236 transmits the sensed PWM control signal 140 to a PWM control signal conditioner 234, which conditions the PWM control signal 140, placing it in a form that is readable by the load controller 52. The illustrated PWM control signal conditioner 234 is a known pulse width to digital converter that converts the PWM control signal 140 to digital form. The load controller 52, the PWM control signal conditioner 234, and the sensor 236 operate in conjunction to form a PMA margin control system.

Figure 4:
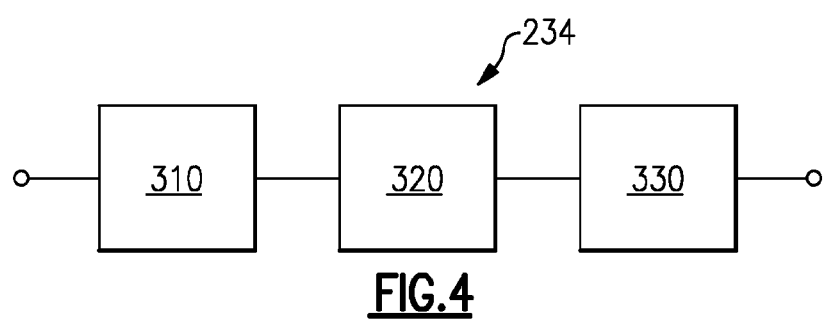
FIG. 4 illustrates an example PWM signal conditioning circuit.

FIG. 4 illustrates an alternate example PWM control signal conditioner 234. The example PWM control signal conditioner 234 of FIG. 4 includes a filter 310, a buffer 320, and an analog to digital converter 330. The filter 310 filters the PWM control signal 140, removing noise or other interference that has entered the PWM control signal 140. The buffer 320 smoothes the PWM control signal 140. The analog to digital converter 330 converts the buffered signal to a digital form that can be read by the load controller 52.

Figure 5:
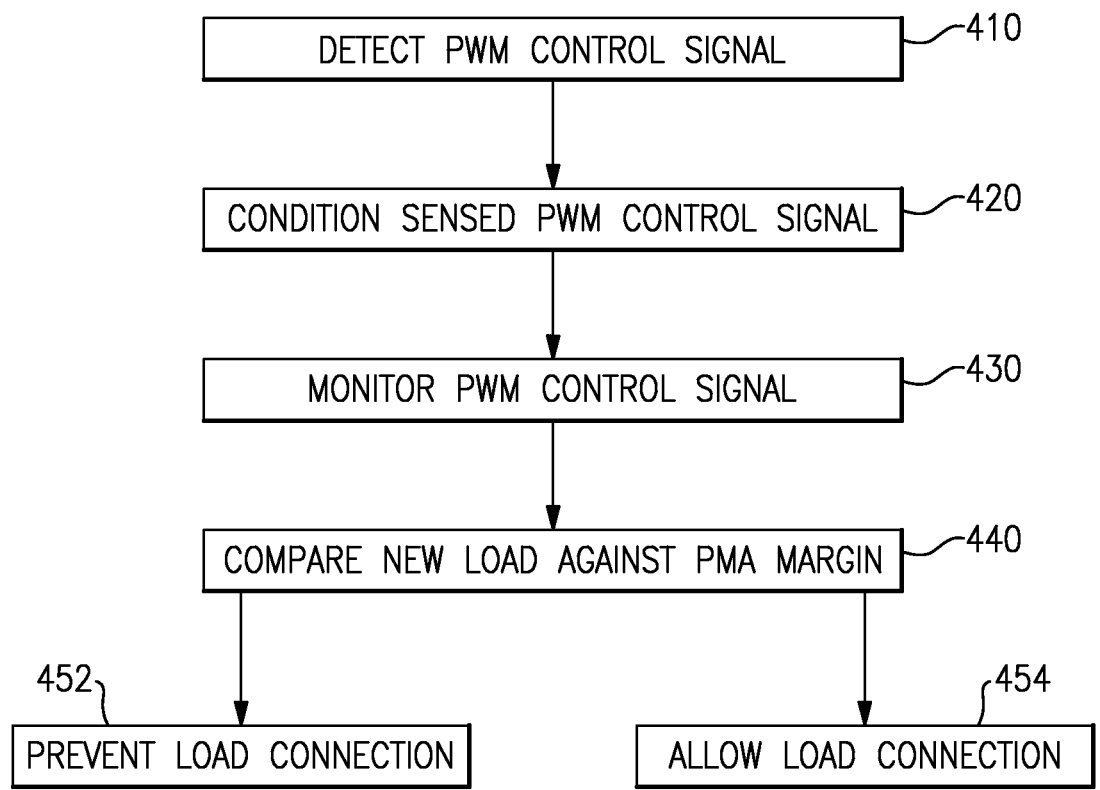
FIG. 5 illustrates a PMA margin of a shunt regulated PMA voltage supply.

FIG. 5 illustrates a method for detecting the PMA margin of a shunt regulated PMA voltage source. Initially a sensor 236 (illustrated in FIG. 3) detects a PWM control signal 140 (illustrated in FIG. 3) in a "detect PWM control signal" step 410. The PWM control signal 140 is then conditioned using a PWM control signal conditioner 234 (illustrated in FIG. 3) in a "condition sensed PWM control signal" step 420. The signal can be conditioned using a known pulse width to digital signal conditioner, or using a filter 310, a buffer 320, and an analog to digital converter 330 (illustrated in FIG. 4). In either case, the PWM control signal 140 is altered by the conditioner to be readable by a load controller 52 (illustrated in FIG. 3) according to known principles.

Once the signal is conditioned, the load controller 52 monitors the PWM control signal 140 in a "monitor PWM control signal" step 430. The monitoring includes determining a PMA margin of the shunt regulated PMA voltage source 10 based on the PWM control signal 140. To determine the PMA margin, the load controller 52 determines a percentage of time for each PWM cycle during which the shunt regulator 30 is on and during which the shunt regulator 30 is off. By subtracting the percentage of each PWM cycle during which the shunt regulator 30 is off from 100%, the load controller 52 can determine the percentage of current being shunted to ground during each PWM cycle. The total available current is then multiplied by the percentage of current being shunted to ground to determine a current value equal to the unused available current from the shunt regulated PMA voltage source 10. This unused available current is referred to as the PMA margin.

An alternate method for monitoring the PMA margin uses the PWM control signal 140 to determine the total time during which the shunt regulator 30 was on during a predetermined period, and divides the total on time by the predetermined time period, thus resulting in a PMA margin percentage. The PMA margin percentage is then multiplied by the total available current from the shunt regulated PMA voltage source 10 to determine the PMA margin.

In order to protect the shunt regulated PMA voltage source 10 from being overloaded, the load controller 52 further performs protection steps whenever a new load is about to be introduced to the shunt regulated PMA voltage source 10. When a new load is about to be introduced, the load controller 52 compares the PMA margin from the monitor PWM control signal step 430 against an anticipated required current draw of the new load in a "compare new load against PMA margin" step 440. If the anticipated current draw of the new load exceeds the PMA margin, the load controller 52 prevents the new load from being connected to the shunt regulated PMA voltage source 10, thereby preventing an overload in a "prevent load connection" step 452. Alternately, if the anticipated current draw of the new load does not exceed the PMA margin, the load controller 52 allows the new load to be connected to the shunt regulated PMA voltage source in an "allow load connection" step 454. If the new load would otherwise be prevented from connecting, higher-level load prioritization logic may determine whether a lower priority load should be shed in order to allow a higher priority load to be connected. In this way, the shunt regulated PMA voltage source 10 is pre-emptively prevented from being overloaded.

Alternately, the detected PMA margin can be stored in a memory, e.g., as part of load controller 52, and used as a reference value to validate future end unit applications, or to validate future performance of the PMA voltage source. The stored and/or presently calculated PMA margin can enable built-in test capabilities, such as determining if the PMA 20 is producing a lower than expected level of current for a given operating mode or trending towards a failure or performance issue. Furthermore, the load controller 52 need not actually control load connections but can represent any processing function configured to determine the PMA margin.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A voltage source comprising:
   a permanent magnet alternator (PMA);
   a shunt regulator connected to receive current from said PMA;
   a pulse width modulation (PWM) controller having a PWM control signal output, said PWM control signal output connected to said shunt regulator, said PWM controller operable to at least partially control switch timing of said shunt regulator; and
   a load controller which determines a PMA margin having an input which corresponds to said PWM control signal output, wherein said PMA margin represents an amount of unused available current to supply from the voltage source to a load.

2. The voltage source of claim 1, further comprising a PWM control signal conditioner for conditioning said PWM control signal output, said PWM control signal conditioner connecting said PWM control signal output to said load controller.

3. The voltage source of claim 2, wherein said PWM control signal conditioner is a pulse width to digital converter.

4. The voltage source of claim 2, wherein said PWM control signal conditioner comprises a filter, a buffer, and an analog to digital converter.

5. The voltage source of claim 4, wherein an input of said filter is connected to said PWM control signal output, an input of said buffer is connected to a filter output, and an input of said analog to digital converter is connected to a buffer output, such that said PWM control signal conditioner is capable of converting a filtered PWM control signal output from analog to digital.

6. A method for protecting a pulse width modulated shunt regulated permanent magnet alternated comprising the step of:
   determining a permanent magnet alternator (PMA) margin of said pulse width modulated shunt regulated permanent magnet alternator from a pulse width modulated (PWM) control signal, using a microprocessor;
   conditioning said PWM control signal using a PWM control signal conditioner such that said microprocessor can read said PWM control signal; and
   monitoring said PWM control signal, using said microprocessor.

7. The method of claim 6, wherein said step of conditioning said PWM control signal comprises the steps of:

filtering said PWM control signal to create a filtered PWM control signal;

buffering said filtered PWM control signal to create a buffered filtered PWM control signal;

converting said buffered filtered PWM control signal from analog to digital using an analog to digital converter; and outputting a signal corresponding to said buffered filtered PWM control signal from said analog to digital converter to said microprocessor.

8. The method of claim 6, wherein said step of conditioning said PWM control signal comprises the steps of:

passing said PWM control signal through a pulse width to digital converter to said microprocessor.

9. The method of claim 6, wherein said step of determining said PMA margin comprises the steps of:

determining an on-time of a shunt regulator based on said PWM control signal; and dividing said on-time by a total time value using a microprocessor, thereby determining a PMA margin.

10. The method of claim 6, wherein said step of determining said PMA margin comprises the steps of:

determining an off-percentage of a shunt regulator corresponding to a percentage of time during which said shunt regulator is off in at least one PWM cycle; and subtracting said off-percentage from 100%, thereby determining a PMA margin.

11. A method for protecting a pulse width modulated shunt regulated permanent magnet alternator comprising the step of:

determining a permanent magnet alternator (PMA) margin of said pulse width modulated shunt regulated permanent magnet alternator from a pulse width modulated (PWM) control signal, using a microprocessor;

further comprising the step of comparing said PMA margin with a required current draw of a new load prior to said microprocessor connecting said new load to a load, wherein said pulse width modulated shunt regulated permanent magnet alternator is a voltage source for said load.

12. The method of claim 11, further comprising the step of connecting said new load to said voltage source when said required current draw is less than or equal to said PMA margin.

13. The method of claim 11, further comprising the step of preventing said new load from connecting to said voltage source when said required current draw exceeds said PMA margin.

14. A method for protecting a pulse width modulated shunt regulated permanent magnet alternator comprising the step of:

determining a permanent magnet alternator (PMA) margin of said pulse width modulated shunt regulated permanent magnet alternator from a pulse width modulated (PWM) control signal, using a microprocessor;

further comprising the step of storing a value representative of said PMA margin in a memory.

15. The method of claim 14, comprising the step of validating performance of said PMA by comparing a detected PMA margin against said stored PMA margin.

* * * * *